July 5, 1932.  T. W. PAUL  1,865,786
DRAFT DEVICE FOR MOWERS
Filed June 29, 1931   2 Sheets-Sheet 1
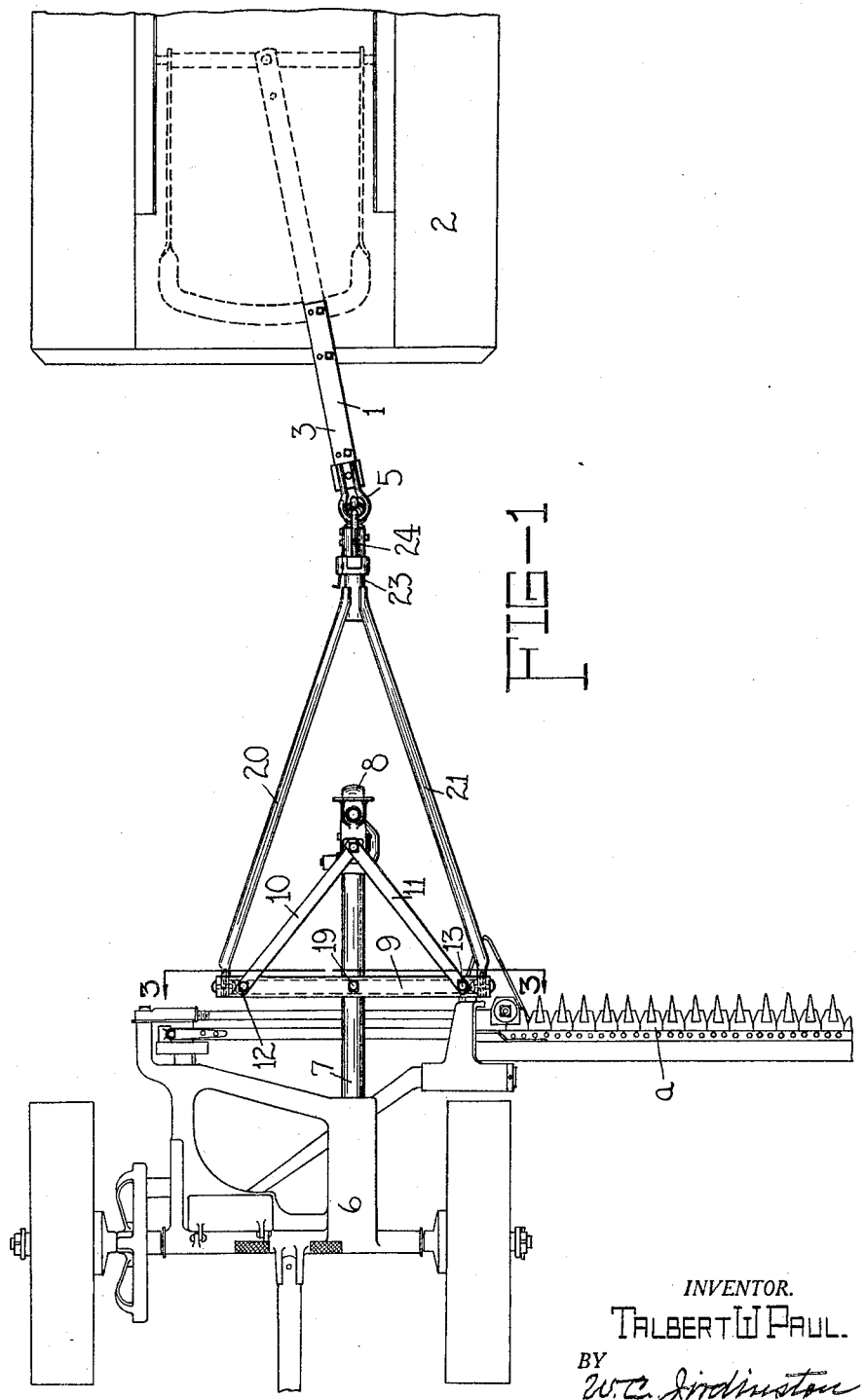
INVENTOR.
TALBERT W PAUL.
BY
ATTORNEY.

July 5, 1932. T. W. PAUL 1,865,786
DRAFT DEVICE FOR MOWERS
Filed June 29, 1931 2 Sheets-Sheet 2
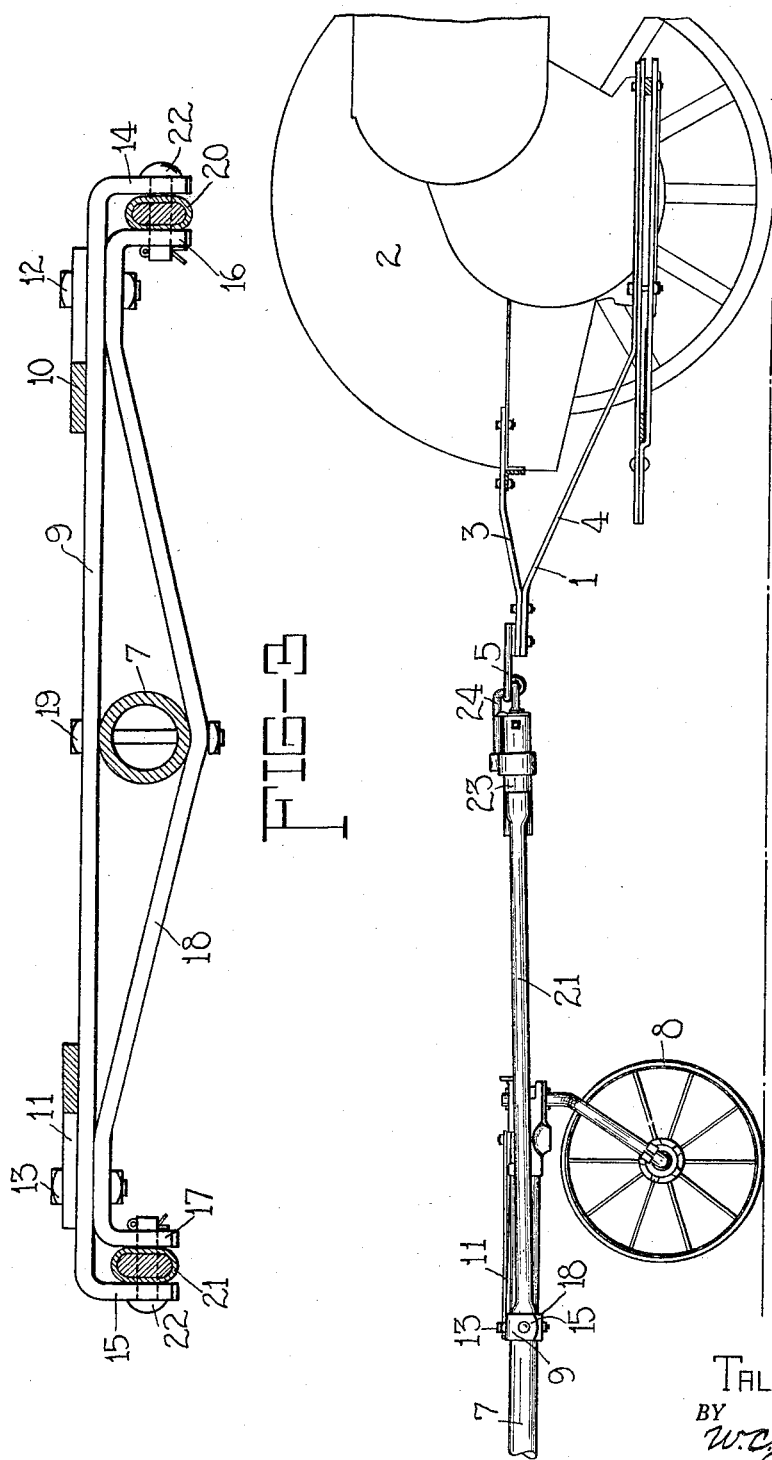
INVENTOR.
TALBERT W PAUL.
BY
ATTORNEY.

Patented July 5, 1932

1,865,786

UNITED STATES PATENT OFFICE

TALBERT W. PAUL, OF MOLINE, ILLINOIS, ASSIGNOR TO DEERE & COMPANY, OF MOLINE, ILLINOIS, A CORPORATION OF ILLINOIS

DRAFT DEVICE FOR MOWERS

Application filed June 29, 1931. Serial No. 547,521.

My invention relates to that type of draft devices particularly adapted for attaching an agricultural machine to a tractor to be drawn thereby and possessing that degree of flexibility desirable for perfect operation of the machine being drawn. My device is shown connecting a mower with a tractor and has for its object to provide a draft device simple in construction and so efficient that the mower, in its operation, will readily follow the contour of the ground surface, and so make an even cut of the crop being harvested.

Referring to the drawings in which similar numerals indicate identical parts—

Figure 1 is a plan view of my invention connected to the stub pole of a mower and pivotally attached to the rear of a tractor;

Figure 2 is a side elevation of Figure 1 slightly enlarged and omitting the mower and the rear wheel of the tractor; and, Figure 3 is an enlarged detail section on the line 3—3 of Figure 1.

I have shown in the drawings, in light lines, sufficient of a mower and tractor to illustrate my invention in use. The drawbar 1 of the tractor 2 is composed of bars 3 and 4, the bar 3 being rigidly secured to the rear platform of the tractor at an angle to the longitudinal median line of the tractor and extending rearwardly to the rear end of the bar 4 to which it is bolted. The bar 4 is secured to the under framing of the tractor, and at the juncture of the bars is rigidly mounted an eyebolt 5. The mower 6 is provided with a stub tongue 7 supported, at its forward end, by a truck 8. The cutter bar $a$ is partly shown.

My invention includes bars 9 and 18 extending transversely of the stub tongue and on opposite sides thereof respectively, and are secured to the stub tongue by a bolt 19. Braces 10 and 11 are secured to the bars 9 and 18 by the bolts 12 and 13 which fasten the bars together; the braces converge forwardly and are bolted to the stub tongue 7. The ends 14 and 15 of the bar 9 are bent downwardly in parallelism with downwardly bent ends of the bar 18 and are spaced therefrom to receive between them the rear ends of a draft tongue composed of duel bars 20 and 21 which in this instance are flattened at their rear ends, between the downwardly extending parts of the bars 9 and 18, and are pivotally secured therebetween by pins 22. The draft bars 20 and 21 converge forwardly to a spring trip device 23 to the rear part of which the forward ends of the bars 20 and 21 are welded or otherwise rigidly secured. The device 23 is provided with a hook member 24 which engages with the eye of the eyebolt 5 and is freely movable therein.

It will be noted that my device is attached to the stub tongue 7 of the mower intermediate the length of the tongue and rearward of the caster wheel 8 and at a location substantially in alinement with the cutting mechanism, so that, as many tests have demonstrated, the weight of the mower forwardly offsets the pulling force of the tractor when the latter is moving over a short rise in the ground surface ahead of the mower. It is obvious that when the mower encounters the rise the pulling force of the tractor will be exerted downwardly, consequently holding the operation of the cutting device to the predetermined height above the ground.

The connection of my device to the tractor is completely flexible to accommodate any movement of the tractor whether changing direction of travel or moving over an uneven surface, and the connection with the mower permits a free vertical movement.

What I claim is:

1. The combination with a mower including a cutter bar and a stub tongue having a supporting truck, and a tractor, of a draft device comprising a transverse element rigidly mounted intermediate its ends on the stub tongue, a draft tongue composed of dual bars attached to the ends of said element respectively by horizontal pivots and converging forwardly and pivotally connected with the rear of the tractor.

2. The combination with a mower including a cutter bar and a stub tongue having a supporting truck at its forward end, and a tractor provided with a drawbar, of a draft device comprising a transverse element rigidly mounted intermediate its ends on the stub tongue in substantial alinement with the cutter bar, a draft tongue composed of dual bars attached to the ends of said element respectively by horizontal pivots and converging forwardly and pivotally connected with the tractor drawbar.

3. The combination with a mower including a cutter bar and a stub tongue having a supporting truck, and a tractor provided with a drawbar, of a draft device connecting the mower with the tractor, said device consisting of a transverse element rigidly secured to the stub tongue rearwardly of said truck and composed of a bar above the tongue and a bar under the tongue, said bars bolted together adjacent their ends and terminating in downwardly bent portions spaced apart, and a draft tongue composed of dual bars having their rear ends secured respectively between the downwardly bent portions on horizontal pivots, said bars converging forwardly and rigidly secured to a hitch device adapted to be pivotally attached to the drawbar of the tractor.

4. The combination with a mower including a cutter bar and a stub tongue having a supporting truck, and a tractor provided with a drawbar, of a draft device connecting the mower with the tractor, said device consisting of a transverse element rigidly secured to the stub tongue rearwardly of said truck and composed of a drawbar above the tongue and a bar under the tongue, said bars bolted together adjacent their ends and terminating in downwardly bent portions spaced apart, braces secured to said element adjacent the ends thereof and converging to the stub tongue and bolted thereto, and a draft tongue composed of dual bars having their rear ends secured between said downwardly bent portions on horizontal pivots, said bars converging forwardly and secured to a hitch device adapted to be pivotally attached to the drawbar of the tractor.

TALBERT W. PAUL.